(12) United States Patent
Catheline et al.

(10) Patent No.: US 9,462,857 B2
(45) Date of Patent: Oct. 11, 2016

(54) DEVICE AND METHOD FOR PIVOTAL ASSEMBLY OF AT LEAST TWO PARTS, CORRESPONDING ASSEMBLY OF THE TWO ASSEMBLED PARTS

(71) Applicant: ROLEX SA, Geneva (CH)

(72) Inventors: Adrien Catheline, Valleiry (FR); Martin Christian, Eteaux (FR); Mathieu Cusin, Andilly (FR); Pierre Sirdey, Geneva (CH)

(73) Assignee: ROLEX SA, Geneva (CH)

( * ) Notice: Subject to any disclaimer, the term of this patent is extended or adjusted under 35 U.S.C. 154(b) by 0 days.

(21) Appl. No.: 14/698,022

(22) Filed: Apr. 28, 2015

(65) Prior Publication Data

US 2015/0313326 A1  Nov. 5, 2015

(30) Foreign Application Priority Data

May 1, 2014  (EP) ..................................... 14166781

(51) Int. Cl.
*A44C 5/10* (2006.01)
*F16G 13/00* (2006.01)
*F16G 15/04* (2006.01)

(52) U.S. Cl.
CPC .................. *A44C 5/107* (2013.01); *A44C 5/10* (2013.01); *F16G 13/00* (2013.01); *F16G 15/04* (2013.01); *Y10T 403/32951* (2015.01)

(58) Field of Classification Search
CPC ......... A44C 5/10; A44C 5/107; F16G 15/04; F16G 13/00
USPC .......................................................... 59/78
See application file for complete search history.

(56) References Cited

U.S. PATENT DOCUMENTS

| | | | | |
|---|---|---|---|---|
| 2,412,120 A * | 12/1946 | Bouchard | ............ | G02C 5/2281 16/228 |
| 2,939,168 A * | 6/1960 | Ferron | .................. | G02C 5/2281 16/228 |
| 3,363,745 A * | 1/1968 | Thuerman | ............... | B65G 17/06 16/386 |
| 3,837,163 A * | 9/1974 | Fujimori | ............... | A44C 27/002 59/80 |
| 4,428,094 A * | 1/1984 | Emain | .................... | E05D 11/082 16/228 |
| 6,418,706 B1 * | 7/2002 | Kit | ........................... | A44C 5/10 59/80 |
| 6,622,469 B2 * | 9/2003 | Gunster | ................. | A44C 5/107 59/80 |
| 6,913,411 B2 * | 7/2005 | Yamakawa | ............ | A44C 5/105 224/164 |
| 8,281,616 B2 * | 10/2012 | Bergundthal | .......... | A44C 5/107 224/164 |

FOREIGN PATENT DOCUMENTS

| | | |
|---|---|---|
| CH | 695 389 A5 | 4/2006 |
| JP | 8-129152 | * 5/1996 |
| JP | 2002-372023 | * 12/2002 |

OTHER PUBLICATIONS

European Search Report dated Sep. 30, 2014, issued in corresponding European application No. EP 14 16 6781; with partial English translation and partial machine English translation (11 pages).

* cited by examiner

*Primary Examiner* — David B Jones
(74) *Attorney, Agent, or Firm* — Westerman, Hattori, Daniels & Adrian, LLP

(57) ABSTRACT

An assembly device (3) for pivotally attaching at least two parts (M1, M2), comprising a screw (4) designed to be screwed into a first piece (M1) and carrying a pivoting guide pin (5) of a second part (M2), wherein this assembly device (3) comprises at least one elastic ring (6) able to work in conjunction with an element blocking one of the two parts (M1, M2), so as to prevent accidental axial movement of the assembly device (3).

22 Claims, 6 Drawing Sheets

A-A

DEVICE AND METHOD FOR PIVOTAL ASSEMBLY OF AT LEAST TWO PARTS, CORRESPONDING ASSEMBLY OF THE TWO ASSEMBLED PARTS

The invention concerns a device for the pivotal assembly or attachment of at least two parts, notably two links of a bracelet, such as a bracelet for a watch for example.

Such an assembly device allows links to be assembled, generally by means of a pivoting guide pin and a screw, the assembled links being able to move in rotation relative to one another.

An assembly of this type is exposed to a risk of becoming accidentally unscrewed. This problem, well known to watchmakers, is caused by the repeated movements of the links in relation to one another when the bracelet is worn or by impacts.

To solve this problem, a device is known from document CH695389 for assembling wristwatch links, able to assemble links formed for example by two outer link segments and one center link segment, the links being able to move angularly in relation to one another. This assembly device includes a screw equipped with a head, at one of its ends, and a threaded part at its other end. A cylindrically-shaped middle part of the screw plays the role of a rotating guide pin of the center link segment. In order to limit the risk of accidental unscrewing, a tubular barrel, made of elastic material and with annular narrowing, is embedded into a screw hole passing through one of the outer link segments. The screw comprises an annular groove designed to receive the narrowing of the barrel. During assembly, the screw is introduced into the barrel until its narrowing engages into the annular groove of the screw. In doing this, the barrel exerts a radial tightening force on the screw in addition to the retaining force exerted by the screw threads. The screw is thus axially blocked in relation to the link. Such a solution requires the assembly of several components, which involves a relatively long assembly time. Furthermore, as the tightening force exerted by the annular narrowing of the barrel on the screw must be significant, the assembly and/or disassembly operations can prove to be difficult.

The present invention improves the situation.

In relation thereto, the invention concerns an assembly device for pivotally attaching at least two parts, comprising a screw designed to be screwed into a first piece and carrying a pivoting guide pin of a second part, wherein this assembly device comprises at least one elastic ring able to work in conjunction with an element blocking one of the two parts, so as to prevent accidental axial movement of the assembly device.

The elastic ring is mounted on the assembly device. Particularly, it can be blocked in axial movement relative to the assembly device.

The invention also relates to an assembly comprising at least two parts attached by means of the assembly device as previously defined.

The invention also relates to an assembly comprising at least two parts attached by means of the assembly device as previously defined.

Finally, the invention concerns a pivotal assembly method of at least two parts using an assembly device as defined previously, wherein it includes, after introduction of the assembly device into a through opening of a second part, a screwing step during which the screw is screwed into a first part, driving the pivoting guide pin of the assembly device in axial translation and the elastic deformation of the elastic ring of the assembly device.

The invention is more precisely defined by the claims. These objects, features and advantages of the present invention will emerge from the following detailed description of special embodiments given by way of non-limiting example and in reference to the enclosed figures, which include:

The invention concerns a pivoting assembly device, or articulation, designed to assemble at least two parts which can pivot in relation to one another. It may be used to assemble links, for example the links of a bracelet such as a bracelet of a wristwatch.

Unless otherwise mentioned, the identical or corresponding elements, shown in the various figures, bear the same references. By convention, the direction parallel to the axis of the assembly device shall be referred to as the longitudinal direction and the perpendicular direction shall be referred to as the transversal direction.

FIGS. 1 to 9 concern a first embodiment of the assembly device 3 of the invention.

Figure 1:
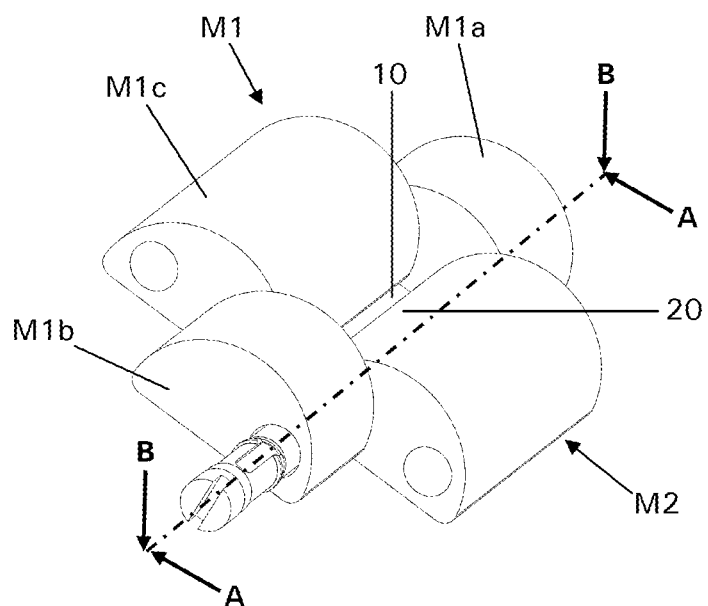
FIG. 1 represents an assembly of two links of a bracelet comprising an assembly device according to a first embodiment of the invention, during mounting.

FIG. 1 shows an assembly of two bracelet links M1, M2 by means of the assembly device 3, during mounting, according to a first embodiment of the invention.

Link M1 is comprised of two outer link segments M1a, M1b integral with one another, in a known manner, notably by means of a center link segment M1c. The term "link segment" here designates a unit, or a single element, of a link. Alternatively, the link M1 may be a single piece. The two outer link segments M1a, M1b and the center link segment M1c define a central slot 10 for receiving a lateral end portion 20 of the link M2, for which only the center link segment is represented in the figures.

Figure 2:
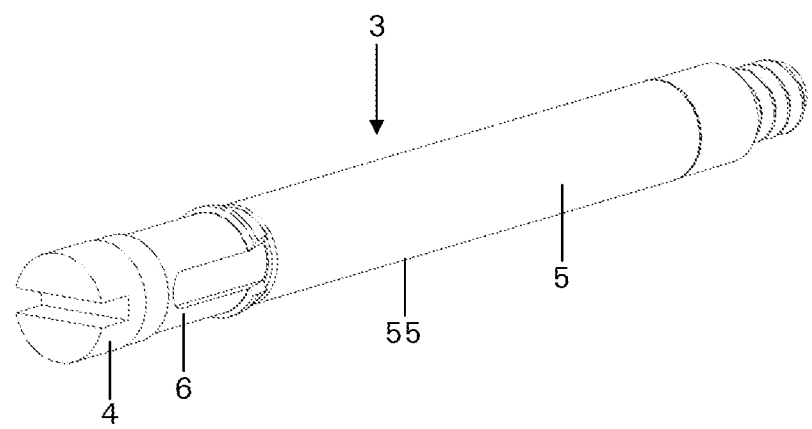
FIG. 2 represents the assembly device according to the first embodiment of the invention.

In reference to FIG. 2, the assembly device 3 comprises a screw 4 and a pivoting guide pin 5, which we may sometimes simply refer to as "pin 5" hereinafter.

Figure 3:
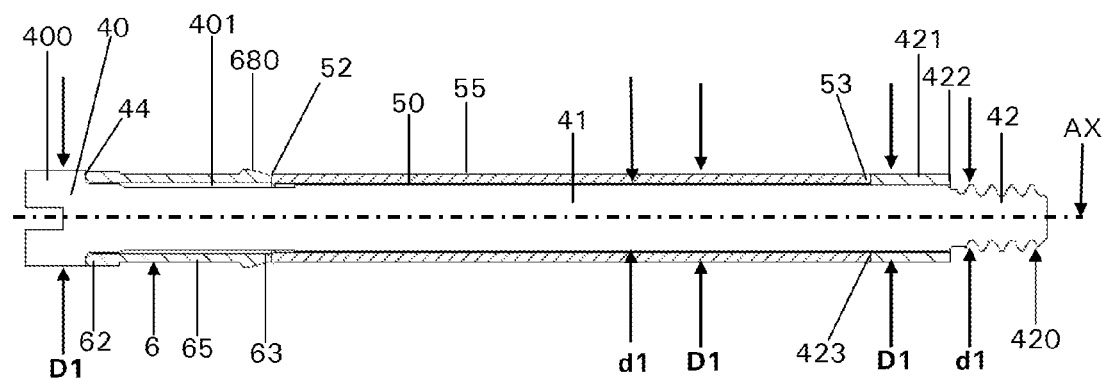
FIG. 3 represents an axial cross section of the assembly device according to the first embodiment.

In reference to FIG. 3, the screw 4 comprises a cylindrically-shaped head part 40 of diameter D1, an intermediate cylindrically-shaped part (or body part) 41, of diameter d1, and a threaded end part 42. The diameter D1 is greater than the diameter d1.

The head part 40 integrates a screw head 400. The head part 40 and intermediate part (or body) 41 are separated by an annular bearing surface 44. They are integral with one another and here form a single-piece component.

The end part 42 comprises a threaded section 420, at one of its ends, and an annular junction section 421, at its other end, connected to one another. The annular junction section 421 is presented as a ring separate from the screw 4, having exterior and interior diameters equal, or substantially equal, to diameters D1 and d1 of screw 4, respectively. It is, for example, integral with the end part 42 of the screw 4 by driving in or welding. One end of the ring 421 forms a bearing surface 423 receiving the support of a second end 53 of the pivoting guide pin 5. The threaded section 420 has an outside diameter here that is equal or substantially equal to the diameter d1.

The pivoting guide pin 5 has a tubular cylindrical shape of axis AX, corresponding to the axis of the screw 4, and comprises a first open end 52 and a second open end 53. It creates an internal well 50 for receiving the screw 4 which is coaxial with the screw 4. The interior diameter of the pin 5 is equal, or substantially equal, to the diameter d1 of the screw 4. Its exterior diameter is substantially equal to the diameter D1 of the screw 4. Its central part has a peripheral surface 55 forming a pivoting surface of a second link M2 relative to a first link M1.

Advantageously, this pivoting guide pin 5 can be made of cintered ceramic, or a composite material formed from a mixture of ceramic and metal, or a polymer (thermoplastic, for example). This material allows friction wear to be reduced. The teachings of patent EP2057914 can be applied for example. Alternatively, the guide pin 5 can be made of steel. The screw 4 and/or annular junction section 421, as well as links M1, M2, can advantageously be made of steel or of a precious metal such as gold or platinum.

The assembly device 3 finally comprises an elastic ring 6, a first end 62 of which comprises an annular shape having an exterior diameter substantially equal to D1, which bears against the bearing surface 44 defined by the head 40 of the screw 4. It comprises a second end 63 that abuttingly engages with the end 52 of the pivoting guide pin 5. The elastic ring 6 is thus assembled to the screw 4 of the assembly device 3. It is incorporated to the assembly device, particularly blocked in axial movement relative to the assembly device.

Figure 4:
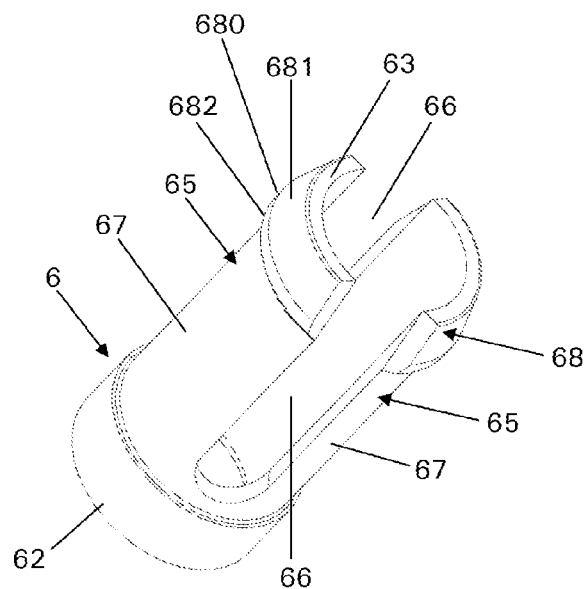
FIG. 4 represents an elastic ring of the assembly device according to the first embodiment.
Figure 5:
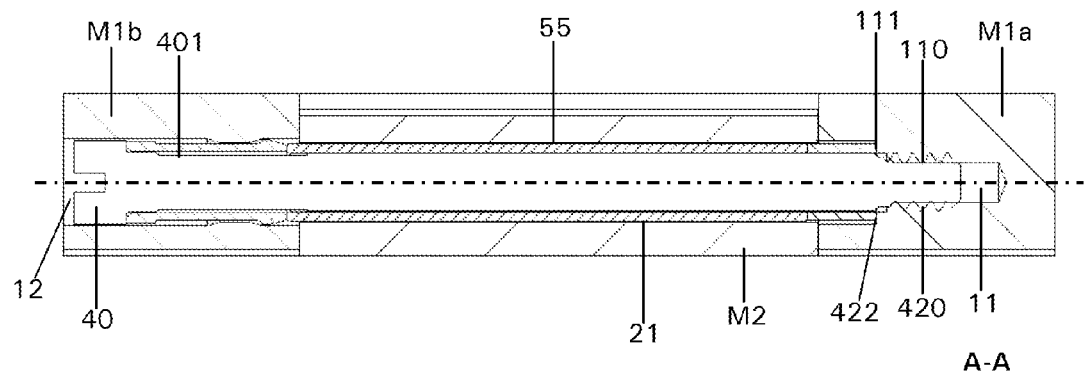
FIG. 5 represents an axial cross-sectional view along A-A of the assembly of FIG. 1, after mounting.
Figure 6:
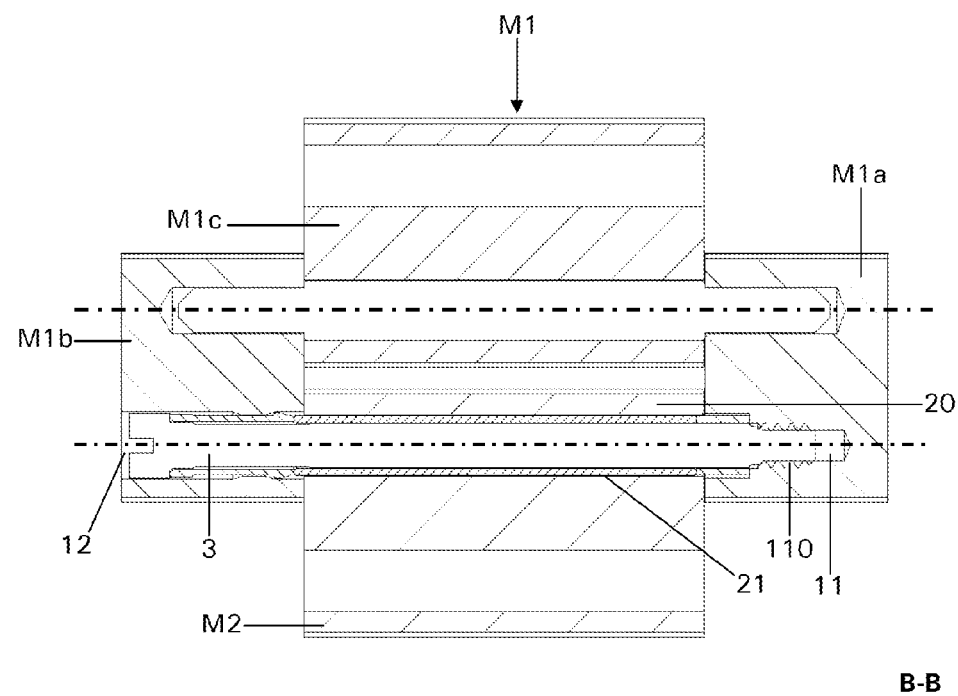
FIG. 6 represents an axial cross-sectional view along B-B of the assembly of FIG. 1.

The elastic ring 6 is more particularly represented in FIG. 4. It thus comprises a first end forming an annular base 62, of diameter substantially equal to D1, which engages around the screw 4, from where extend two elastic clips 65 in a longitudinal direction, i.e. parallel to the axis of the elastic ring 6. It is to be noted that when the assembly device 3 is mounted, this axis of the elastic ring coincides with the axis AX of pin 5 and the axis of the assembly device 3. The two elastic clips 65 of the ring 6 take the form of cylindrical portions, truncated by two longitudinal notches 66. This elastic clip 65 comprises a first part 67 in the shape of a cylindrical portion, of diameter slightly less than the diameter of the annular base 62. Each elastic clip 65 comprises a head 68, oriented toward the second end 63 of the elastic ring 6. At their respective ends, these heads 68 have cylindrical portions of diameter substantially equal to the diameter of the annular base 62 which is, here, substantially equal to the diameter D1 of the screw 4. These heads 68 further comprise an annular portion 680 of diameter D2, defined by two beveled edges 681, 682 to respectively facilitate the insertion and removal of the assembly device 3, as will be detailed hereinafter. In the embodiment illustrated, the diameter D2 is greater than the diameter D1. The annular portion 680 of greatest diameter thus forms a protruding peripheral zone, or bulging, of the elastic ring 6 and the assembly device 3 after it is mounted, which provides axial blocking of the assembly device through cooperation with a link obstacle. This annular portion 680 is effectively designed to be inserted into a special complementary shaped zone (zone 120) arranged in a link to be assembled, as will be detailed hereinafter. According to this embodiment, the elastic ring 6 is designed to be mounted toward the head 40 of the screw 4. The latter has a cross section of reduced diameter d2 in relation to the elastic clips 65, in order to free up a space 401 between the exterior peripheral surface of the screw 4 and the elastic clips 65, thus enabling them to become deformed in the direction of the screw 4.

The center link segment of the second link M2 is pierced by a cylindrical through hole 21 of the assembly device 3, of diameter substantially equal to or slightly greater than D1, in its lateral end portion 20.

The link segment M1*a* of the first link M1 comprises a hole 11 for receiving the threaded end 420 of the assembly device 3, equipped with an internal thread 110. Here, the hole 11 is a blind hole. Alternatively, it could pass through the link segment M1*a*. The hole 11 is slightly larger, near its opening on the slot 10, so as to form a bearing surface 111 acting as a positioning stop for the screw 4 when screwed home, more particularly providing support for the trailing end 422 of the annular junction section 421.

The link segment M1*b* of the first link M1 is pierced by a through hole or an opening 12 of the assembly device 3, shaped to accommodate the elastic ring 6. As is shown more particularly in FIGS. 7 and 8, the hole 12 comprises a zone 120 of smaller diameter, surrounded by two beveled edges 121, 122. The diameter of this zone 120 remains, however, greater than or equal to the diameter of the pivoting guide pin 5 enabling it to be inserted through the opening 12 without resistance.

The assembly device 3 is preassembled through the implementation of the steps described hereinafter:

During a first step, the elastic ring 6 and the pin 5 are arranged around the body of the screw 4. To do this, the elastic ring 6 is first inserted by the end part 42 of the screw, until its annular base 62 abuts against the bearing surface 44 at the level of the head 40 of the screw. Next, the pin 5 is then inserted by the end part of the screw until its first end 52 abuts against the second end 63 of the elastic ring 6. It is to be noted that the elastic ring 6, the pin 5 and the screw 4 are thus assembled coaxially, and the axis of the assembled assembly device 3 thus coincides with the axis AX of the screw 4 and the pin 5 and with the center axis of the elastic ring 6.

During a second step, the annular junction section 421 of the end part 42 is introduced by the end part of the screw until its first end 423 abuts against the second end 53 of the pin 5. Next, this annular junction section 421 is rendered integral with the screw.

Following these mounting steps of the assembly device 3, the pin 5 is located between two abutment surfaces, formed by the bearing surface 44, by means of the intermediary elastic ring 6, and by the end 423 of the annular junction section 421 of the free end of the end part 42. Clearance may sometimes be provided at the level of these abutment surfaces. The pin 5 can thus remain rotatably mobile around the screw 4, but blocked axially by the screw head 40 and by the ring-shaped annular junction section 421.

Alternatively, the pin 5 can be made integral with the screw, for example by driving or welding on the body of the screw 4, in which case its rotation relative to the screw 4 will be prevented. Alternatively, this rotation can be prevented by means of a non-circular profile of a corresponding surface area of the screw 4 and/or the pin 5. This solution can notably be retained if the pin is made of a material that is difficult to drive in or solder, such as ceramic.

Figure 7:
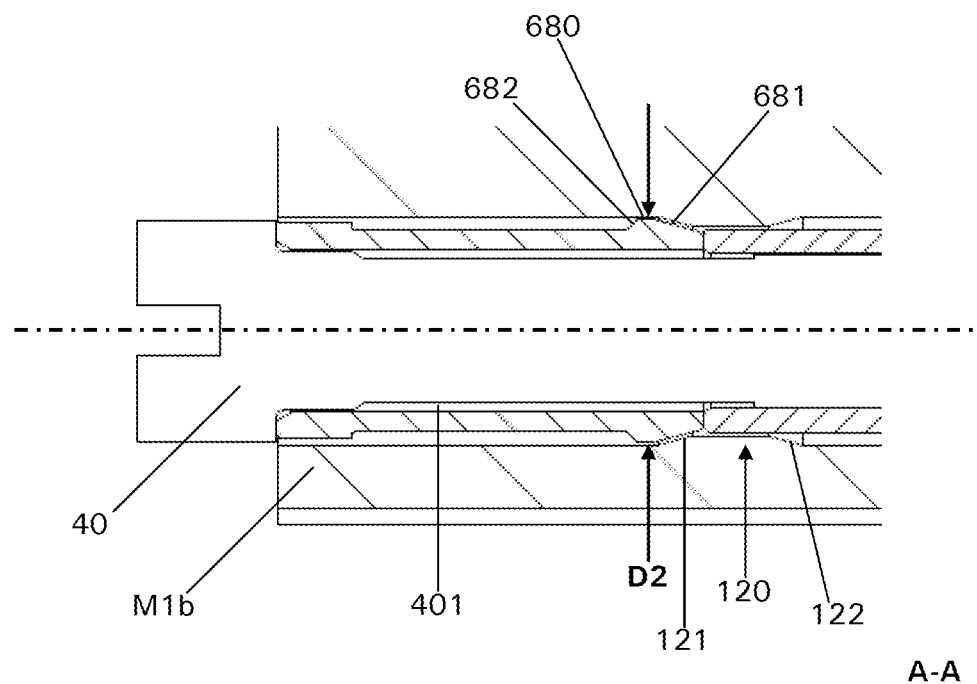
FIG. 7 represents an axial cross-sectional view along A-A of the assembly of FIG. 1 at the level of the elastic ring in an intermediate phase of its mounting.

The method for assembling two links M1, M2 using the assembly device 3, once it is assembled, in reference to FIGS. 7 and 8, will now be described.

During a first step, the links M1 and M2 are placed in assembly position. In relation thereto, the lateral end portion 20 of the center link segment of the second link M2 is introduced into the slot 10 formed between the two links M1a and M1b of the first link M1. The openings 11, 21 and 12 are aligned to form a passageway for receiving the assembly device 3.

During a second step, the assembly device 3 is introduced through this passageway formed by the openings 11, 21 and 12, until the portion 680 of diameter greater than the elastic ring 6 cooperates with a first beveled edge 121 of a zone 120 of smaller diameter of the opening 12 of the center link segment M1 b. FIG. 7 represents the intermediary situation in which the portion 680 of larger diameter of the elastic clips 65 comes into contact with the first beveled edge 121. At the same time, the threaded section 420 of the screw 4 cooperates with the corresponding threads 110 of the opening 11 of the other side link segment M1a of the first link M1.

During a third step, the screwing of the screw 4 allows its insertion to continue through the openings 11, 21, and 12. To do this, the screw 4 is turned, by an operator for example, by driving the screw head 400 in rotation. The screwing torque exerted to turn the screw 4 must be greater than the resisting torque exerted by the contact of the elastic ring 6 against the edge 121 inside the opening 12. In other words, the operator must overcome the friction exerted by this contact.

When turned, the screw 4 moves in a helicoidal movement comprising an axial component in the direction of screwing: this screwing begins as soon as the threaded end 420 of the screw 4 is engaged in the internal thread 110 of the link segment M1a. During its helicoidal movement, the screw 4 is driven in axial translation, which causes the axial translation of the pin 5 and the entire assembly device, which thus penetrates into the passageway formed by the openings 11, 21 and 12 passing through the links M1 and M2.

During this insertion movement, the elastic clips 65 of the elastic ring 6 are pressed toward the surface of the screw 4 within the space 401, enabling the largest diameter portion 680 of the elastic ring 6 to retract in order to extend past the smaller diameter zone 120 of the opening 12. During this movement of the elastic ring, the first beveled edge 681 of the end of the elastic ring 6 slides against a beveled edge 121 of similar slope of the smaller diameter zone 120 of the opening 12. These two beveled edges thus enable the appropriate elastic deformation of the elastic ring 6 during insertion of the assembly device 3. It is to be noted that the zone 120 and the geometry of the elastic ring 6 are configured so that the ring retracts when inserted, then is maintained in final position, without interfering with the insertion or removal of the rest of the assembly device 3.

Figure 8:
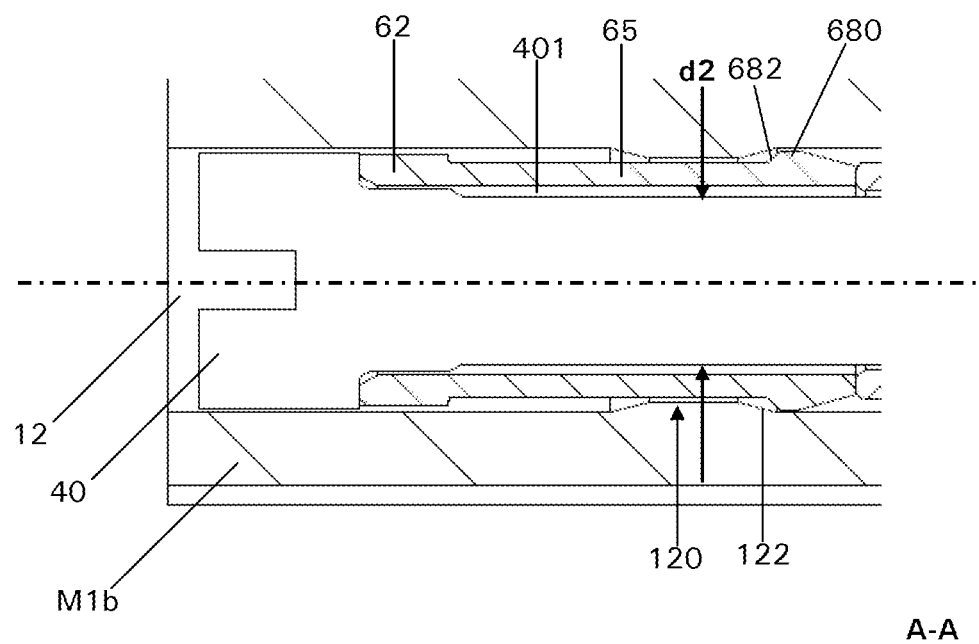
FIG. 8 represents an axial cross-sectional view along A-A of the assembly of FIG. 1 in its final assembly position at the level of the elastic ring.
Figure 9:
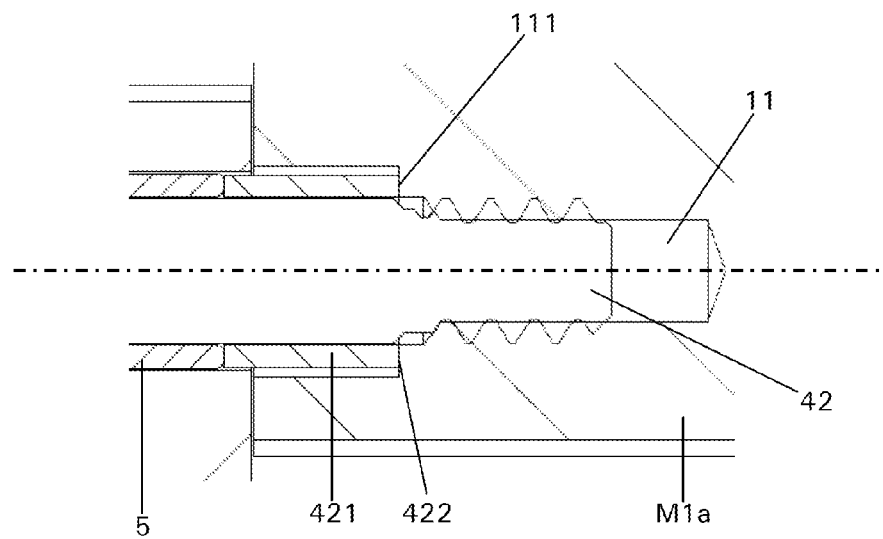
FIG. 9 represents an axial cross-sectional view along A-A of the assembly of FIG. 1 in its final position at the level of the terminal portion of the screw of the assembly device.

FIG. 8 represents the final position of the elastic ring 6, when the assembly device 3 reaches its final position, in which the head 40 of the screw 4 is entirely lodged in the opening 12. This final position is advantageously defined by an abutment formed by a link segment, against which the assembly device 3 presses. In this embodiment, this stop is arranged by a bearing surface 111 at the opening 11 of the link segment M1a. As shown in FIG. 9, the end 422 of the assembly section 421 of the assembly device 3 abuts against this bearing surface 111 of the opening 11. Alternatively, the longitudinal positioning of the assembly device 3 in relation to the links M1 and M2 may be performed by an alternative or additional stop against which the screw 4 abuts.

In the final position of the assembly device 3, the elastic ring 6 extended past the zone 120 of the opening 12 to reach a zone of larger diameter, of diameter greater than the diameter D1, in which the elastic clips 65 of the elastic ring 6 were able to return to their initial configuration, by elastic return. In the final position, the elastic ring is thus at rest, and its elastic clips are not subjected to any stress. They are thus under compression for a brief instant, when the assembly device is inserted, and the elastic ring is thereby subjected to minimal wear. In the final position, the assembly device is not subject to any radial stress, no tightening on its exterior surface. Alternatively, the ring may remain compressed and under stress in its final position to provide resistance, by additional friction, to axial blocking.

In final position of the assembly device 3, the pivoting guide pin 5 is maintained axially in relation to the links M1, M2 by the force exerted by the threads 420 of the screw 4 within the tapped hole 11 of the link M1. The links M1 and M2 are thus assembled, the link M2 being able to pivot in relation to the link M1 around the pivoting guide pin 5.

When the bracelet is worn or subjected to impacts, repetitive contact occurs between the exterior surface 55 of the pin 5 and the interior wall of the hole 21 of the central link segment M2. This induces slight angular displacements of the pin 5 in relation to the exterior link M1. These angular displacements would likely inadvertently loosen the screw 4 and lead to the accidental disassembly of the assembly device 3. However, such an event cannot occur with the solution according to this embodiment, as a second beveled edge 122 of the smaller diameter zone 120 of the opening 12 forms an obstacle against which the end 68 of the elastic clips 65 of the elastic ring 6, protruding on the assembly device 3, remains blocked, preventing all untimely rearward movement of the assembly device 3. In doing this, the screw 4 is not affected by repeated contacts between the center link segment M2 and the pin 5. It remains in its screwed position. The risk of untimely loosening is thus eliminated.

To remove the assembly device 3, in order to detach the links M1 and M2, an operator simply has to turn the screw 4 in the unscrewing direction, by means of the screw head 400, while exerting an unscrewing torque greater than the resisting torque formed by the cooperation of the elastic clips 65 with the opening, 12, as explained above. As it is turned in the unscrewing direction, the screw 4 performs a helicoidal movement that allows the assembly device 3 to be disassembled, during which the elastic clips 65 are subjected to temporary compression, in a similar manner and opposite to the screwing phase explained previously. In this phase, the other beveled edges 682, 122 of the largest diameter portion 680 of the elastic ring and the reduced diameter zone 120 of the opening 12, respectively, cooperate to allow the elastic retraction of the elastic ring.

Figure 10:
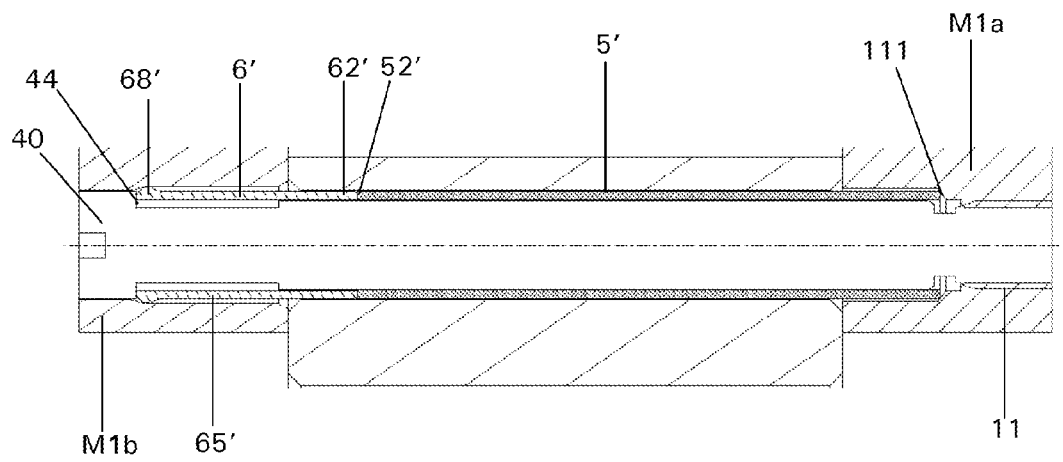
FIG. 10 represents an axial cross-sectional view of the assembly device according to a second embodiment.
Figure 11:
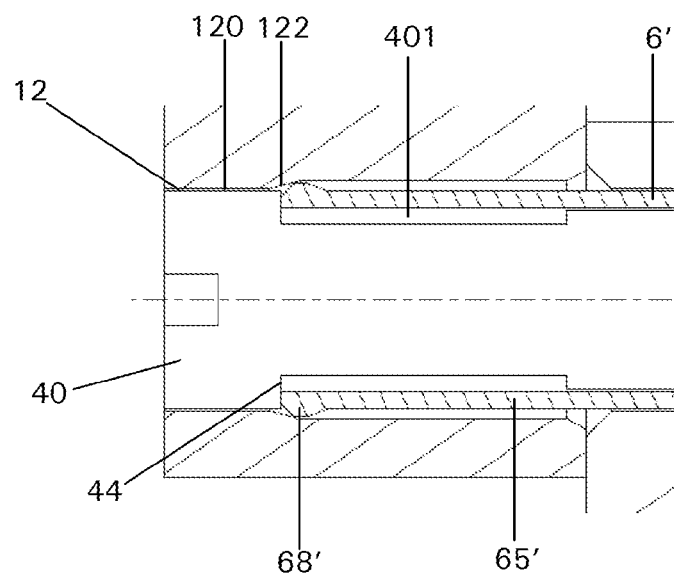
FIG. 11 represents an axial cross-sectional view of the assembly device at the level of the elastic ring according to the second embodiment.

FIGS. 10 and 11 concern a second embodiment of the assembly device 3 of the invention. For the sake of clarity, only the elements different from the first embodiment described will now be described.

In this second embodiment, the annular junction section 421 provided in the first embodiment is removed, and the pivoting guide pin 5' extends to the end part of the screw 4, directly abutting against the bearing surface 111 of the opening 11 of the link segment M1*a*. Furthermore, the elastic ring 6' comprises an annular base 62' arranged in the continuation of the first end 52' of the pivoting guide pin 5'. The elastic clips 65' extend from this annular base 62' in the direction opposite that of the first embodiment. The end 68' of these elastic clips 65' can abut against the bearing surface 44 of the head 40 of the screw 4. The interior surface of the opening 12 of the link segment M1*b* also forms a single edge 122 enabling the assembly device 3 to be removed, but preventing it from loosening in an untimely manner, according to a mechanism similar to the first embodiment. The retraction of the elastic ring 6' into a space 401 formed by a throat of the screw 4 is made possible by the opening of the opening 12, which receives the head 40 of the screw 4 in final position.

Figure 12:
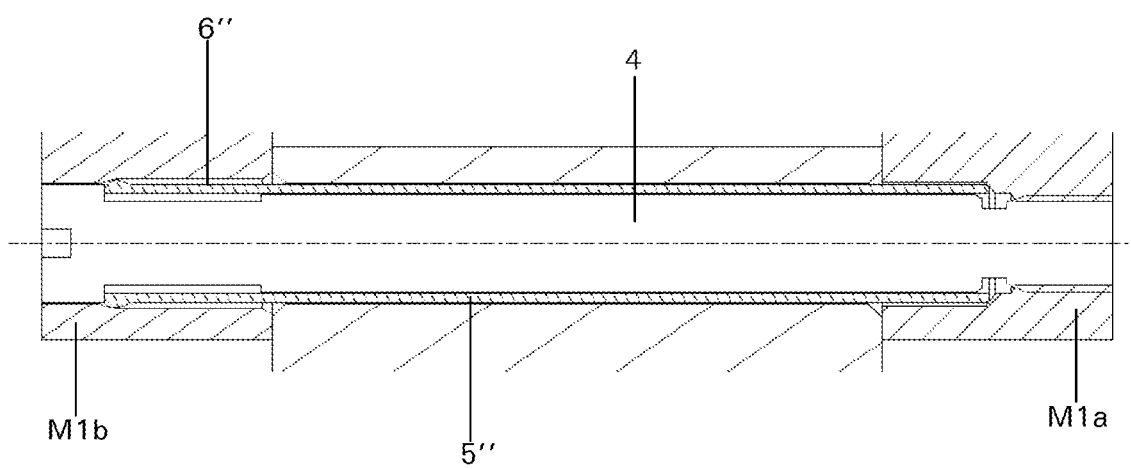
FIG. 12 represents an axial cross-sectional view of the assembly device according to a third embodiment.

FIG. 12 represents a third embodiment, similar to the previous embodiment, in which the pivoting guide pin 5'' also integrates the elastic ring 6''. Thus, in this third embodiment, the pivoting guide pin 5'' comprises the pin 5, the annular junction section 421 and the elastic ring 6 of the first embodiment, in a single part.

In a fourth embodiment not shown, a part of the body of the screw may directly represent the pivoting guide pin. In such an embodiment, the pivoting guide pin 5 and the screw 4 of the previous embodiments are no longer two separate parts, but one single part. In all embodiments, the pivoting guide pin is incorporated into the assembly device, particularly blocked in axial movement relative to the assembly device. In this embodiment, the body of the screw may comprise a throat toward the head of the screw, wherein an elastic ring will be secured. This elastic ring may take the shape of a split ring, for forming elastic clips. This embodiment would have the advantage of minimizing the number of parts used.

In all the embodiments previously described, the assembly device finally comprises a first element performing the screwing function, in the form of a threaded part, for appropriate and removable fastening of the assembly device, and a second axial blocking element, in the form of an elastic ring, fulfilling the axial blocking function of the assembly device during weak solicitations, notably induced when the bracelet is worn, so as to prevent the untimely loosening of the first element.

Previously, these two elements were arranged on two different elements of the assembly device, to act cooperatively within two separate edge link segments of a bracelet link. Alternatively, they can be arranged near one another to cooperate within the same link segment. For example, the threaded section of the screw may adjoin the screw head. Alternatively, the elastic ring may be arranged toward the end of the screw opposite the head.

The second block element is presented here in the form of an elastic ring, having two elastic clips, extending in one longitudinal direction, parallel to the axis of the assembly device. Naturally, the elastic ring may alternatively comprise three or more elastic clips, or even a single elastic clip. Alternatively, the elastic ring may take the shape of a split ring implemented, for example, by a wire spring. Alternatively, several elastic rings may be used.

Preferably, the elastic ring is mounted in a rotatably mobile manner around the body of the screw. Alternatively, it may be mounted around the pivoting guide pin. Furthermore, it may either be formed by a separate element, or be integral with the pivoting guide pin, or even the screw. Thus, the elastic ring can be secured to the body of the screw. In all embodiments, the elastic ring is thus mounted on the assembly device. It is incorporated to the assembly device, particularly blocked in axial movement relative to the assembly device. It remains assembled to the assembly device when inserted and removed from the parts to assemble. According to an embodiment, it comprises an annular base arranged around the assembly device, particularly around the screw. Said annular base, like the whole elastic ring, is thus incorporated to the assembly device when used for the assembly of several parts.

This elastic ring may take on any other geometric shape, comprising one or more parts cooperating by obstacle with a part of particular geometry of a link, forming a narrowing, to create an obstacle to axial movement of the elastic ring, sufficient to block its movement and that of the entire assembly device, when simply wearing the bracelet, but enabling the elastic ring to be released through manual screwing or unscrewing of the assembly device. To do this, the ring comprises one or two beveled edges to promote its elastic deformation during its removal or insertion.

The geometry and the material of the elastic ring are defined such that its compression results in a minimal resistive torque during screwing or unscrewing of the screw, while axially blocking the assembly device during the loads exerted while simply wearing it. Advantageously, the elastic ring is made of spring steel, for example Phynox, Phytime or Nivaflex.

The invention claimed is:

1. An assembly device for pivotally attaching at least first and second parts, comprising:
   a screw configured to be screwed into a first part,
   a pivoting guide pin for a second part, the pivoting guide pin being carried by the screw, and
   at least one elastic ring mounted on the assembly device,
   wherein the at least one elastic ring is configured to cooperate with a blocking element of one of the first part and the second part, so as to prevent accidental axial movement of the assembly device,
   wherein the assembly device is in a free state in which the screw is not screwed.

2. The assembly device as claimed claim 1, wherein the elastic ring is secured to the assembly device.

3. The assembly device as claimed claim 2, wherein the elastic ring is blocked in axial movement relative to the assembly device.

4. The assembly device as claimed in claim 1,
   wherein the screw comprises a part having a first diameter defining a bearing and a central part of smaller diameter than the part, the pivoting guide pin being arranged around the central part and having a diameter substantially equal to the first diameter, and
   wherein the elastic ring abuts between the bearing surface and the pivoting guide pin and has an elastic part comprising a portion of greater diameter.

5. The assembly device as claimed in claim 4, wherein the portion of greater diameter of the elastic part has a diameter greater than the first diameter.

6. The assembly device as claimed in claim 1, wherein the screw comprises a central section around which is arranged the pivoting guide pin, and wherein the elastic ring (i) is integral with the pivoting guide pin, (ii) is arranged at an end of the pivoting guide pin, or (iii) is directly formed in the pivoting guide pin with which the elastic ring forms a single piece.

7. The assembly device as claimed in claim 1, wherein the screw comprises a head, a central part and an end part which comprises a threaded section of smaller diameter than a diameter of the central part.

8. The assembly device as claimed in claim 1, wherein the pivoting guide pin is a separate piece from the screw and is rotatably mobile around the screw.

9. The assembly device as claimed in claim 1, wherein at least one of (i) the pivoting guide pin is made of sintered ceramic or composite material, and (ii) the elastic ring is made of spring steel.

10. The assembly device as claimed in claim 9, wherein the pivoting guide pin is made of sintered ceramic or composite material, formed from a mixture of ceramic and metal or a polymer.

11. The assembly device as claimed in claim 1, wherein the pivoting guide pin is a separate piece from the screw and is fixed relative to the screw, or wherein the pivoting guide pin and the screw form the same part.

12. The assembly device as claimed in claim 1, wherein the pivoting guide pin and the screw are in one piece.

13. An assembly device for pivotally attaching at least first and second parts, comprising:
   a screw configured to be screwed into a first part,
   a pivoting guide pin for a second part, the pivoting guide pin being carried by the screw, and
   at least one elastic ring mounted on the assembly device,
   wherein the at least one elastic ring is configured to cooperate with a blocking element of one of the first and second parts, so as to prevent accidental axial movement of the assembly device,
   wherein the elastic ring comprises at least one elastic clip arranged on a periphery of at least one of (i) the screw and (ii) the pivoting guide pin.

14. The assembly device as claimed in claim 13, wherein the elastic ring is arranged around the screw, and wherein a space is provided between the elastic clip of the elastic ring and the screw to allow an elastic return of the elastic clip toward the screw during insertion and removal of the assembly device into and from the first and second parts.

15. An assembly device for pivotally attaching at least first and second parts, comprising:
   a screw configured to be screwed into a first part,
   a pivoting guide pin for a second part, the pivoting guide pin being carried by the screw, and
   at least one elastic ring mounted on the assembly device,
   wherein the at least one elastic ring is configured to cooperate with a blocking element of one of the first and second parts, so as to prevent accidental axial movement of the assembly device,
   wherein the elastic ring comprises an annular base from where extend at least two elastic clips parallel to an axis of the assembly device, the elastic clips comprising a portion configured to cooperate with a blocking element of one of the first and second parts of greater diameter than a diameter of the pivoting guide pin, wherein the portion is surrounded by at least one beveled edge to promote at least one of (i) an insertion of the assembly device into the first and second parts and (ii) a removal of the assembly device from the first and second parts.

16. An assembly comprising first and second parts attached using an assembly device inserted into openings of the first and second parts and pivotally attaching at least first and second parts,
   wherein the assembly device comprises:
   a screw screwed into a first part,
   a pivoting guide pin for a second part, the pivoting guide pin being carried by the screw, and
   at least one elastic ring mounted on the assembly device,
   wherein the at least one elastic ring is configured to cooperate with a blocking element of one of the first and second parts, so as to prevent accidental axial movement of the assembly device, and to release the assembly device in a free state when the screw is unscrewed.

17. The assembly as claimed in claim 16, wherein the opening of the first part comprises a zone of smaller diameter forming an obstacle to the elastic ring preventing an untimely axial removal of the assembly device.

18. The assembly as claimed in claim 17, wherein the zone of smaller diameter allows retraction of the elastic ring and passage of the rest of the assembly device for at least one of (i) insertion of the assembly device into and (ii) removal of the assembly device from the openings of the first and second parts to be attached.

19. The assembly as claimed in claim 17, wherein the elastic ring and the zone of smaller diameter of the opening of the first part each comprise one or two beveled edges respectively, of similar inclination, to promote at least one of (i) an insertion of the assembly device when screwing the assembly device for insertion and (ii) a removal of the assembly device when unscrewing the assembly device for removal.

20. The assembly as claimed in claim 16, wherein the elastic ring of the assembly device occupies a non-stressed final position when the first and second parts are attached by means of the assembly device.

21. A bracelet comprising at least one assembly as claimed in claim 16.

22. A method of assembling first and second parts, comprising:
   providing an assembly device as claimed in claim 1,
   introducing the assembly device into an opening passing through the second part, and
   screwing the screw into the first part, so as to drive in axial translation the pivoting guide pin of the assembly device and deform elastically the elastic ring of the assembly device,
   so that the elastic ring cooperates with a blocking element of one of the first and second parts to prevent accidental axial movement of the assembly device.

* * * * *